(12) United States Patent
Shiraishi

(10) Patent No.: US 11,797,470 B2
(45) Date of Patent: Oct. 24, 2023

(54) ELECTRONIC DEVICE AND CONTROL METHOD THEREOF

(71) Applicant: CANON KABUSHIKI KAISHA, Tokyo (JP)

(72) Inventor: Yasuhiro Shiraishi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/515,732

(22) Filed: Nov. 1, 2021

(65) Prior Publication Data

US 2022/0050804 A1 Feb. 17, 2022

Related U.S. Application Data

(63) Continuation of application No. PCT/JP2020/016324, filed on Apr. 13, 2020.

(30) Foreign Application Priority Data

May 7, 2019 (JP) ................................. 2019-087722

(51) Int. Cl.
*G06F 13/42* (2006.01)
*G06F 13/10* (2006.01)
*G06F 13/38* (2006.01)

(52) U.S. Cl.
CPC ........ *G06F 13/4282* (2013.01); *G06F 13/102* (2013.01); *G06F 13/385* (2013.01); *G06F 2213/0042* (2013.01)

(58) Field of Classification Search
CPC .................................................... G06F 13/385
See application file for complete search history.

(56) References Cited

U.S. PATENT DOCUMENTS

| | | | | |
|---|---|---|---|---|
| 6,473,811 B1* | 10/2002 | Onsen | ................ | H04N 1/32539 709/224 |
| 8,123,570 B2* | 2/2012 | Chang | ................ | H01R 13/6658 439/676 |
| 9,710,207 B2* | 7/2017 | Takano | ................ | G06F 3/1274 |
| 2009/0042608 A1* | 2/2009 | Moon | ............... | H04M 1/72409 455/556.1 |

FOREIGN PATENT DOCUMENTS

| | | |
|---|---|---|
| JP | 2012-003470 A | 1/2012 |
| JP | 2018-173886 A | 11/2018 |
| JP | 2018-200345 A | 12/2018 |

* cited by examiner

*Primary Examiner* — Steven G Snyder
*Assistant Examiner* — Juanito C Borromeo
(74) *Attorney, Agent, or Firm* — Cowan, Liebowitz & Latman, P.C.

(57) ABSTRACT

An electronic device includes a communication unit, a control unit, and a display unit. The communication unit communicates with an external device using one of communication methods. The control unit determines a communication method, from among the communication methods, unable to be used in communication with the external device. The display unit displays an user interface that is not capable of selecting the determined communication method.

9 Claims, 12 Drawing Sheets

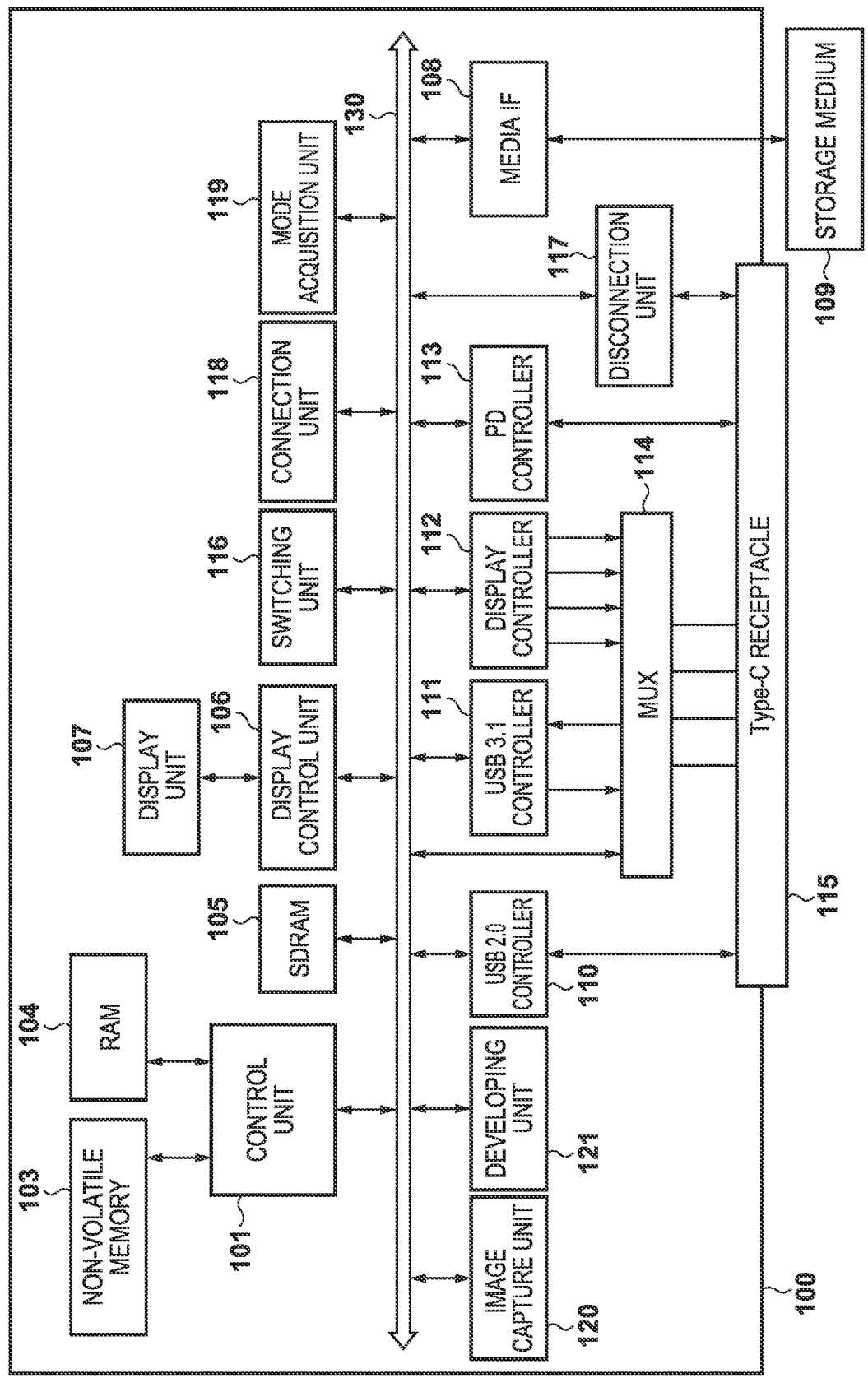

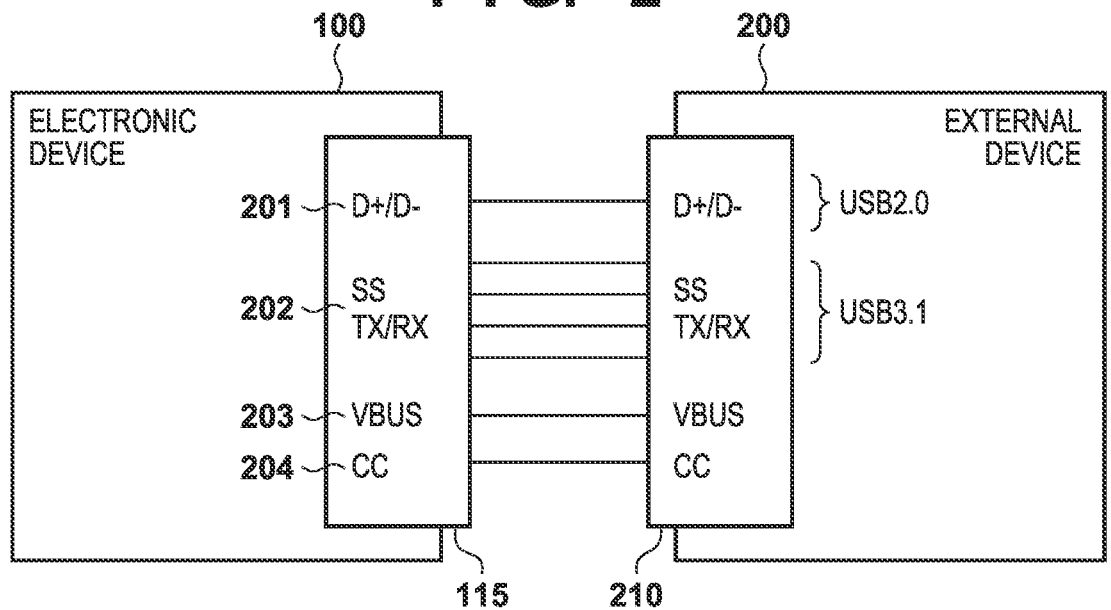
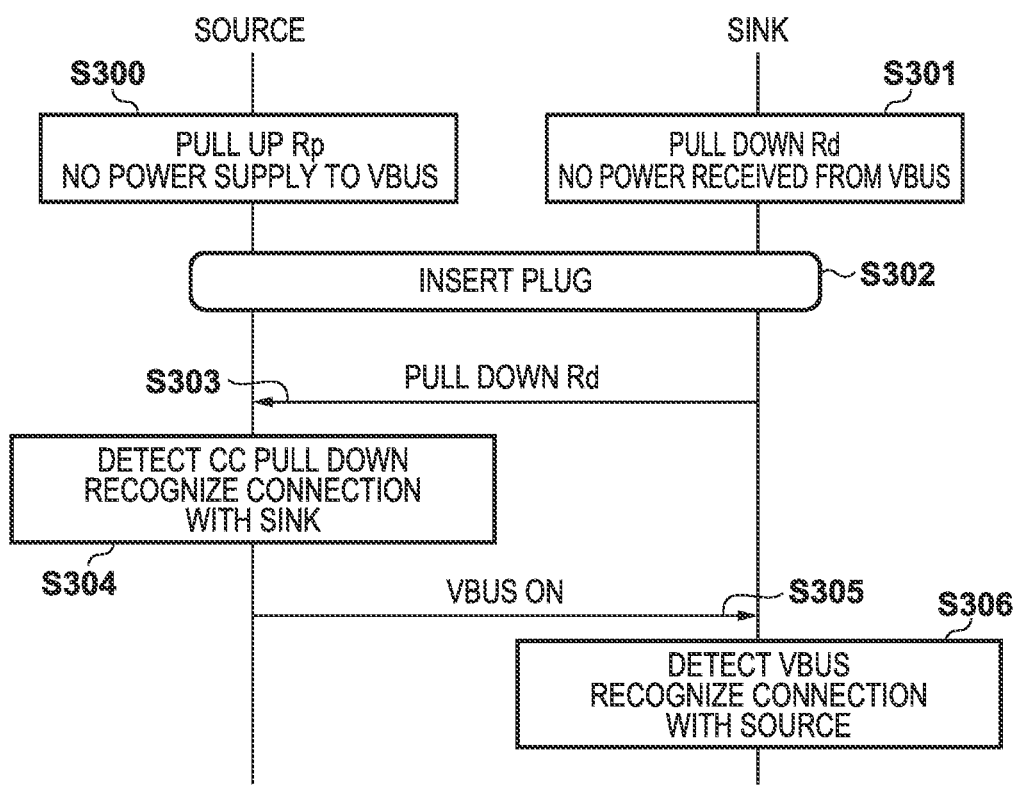

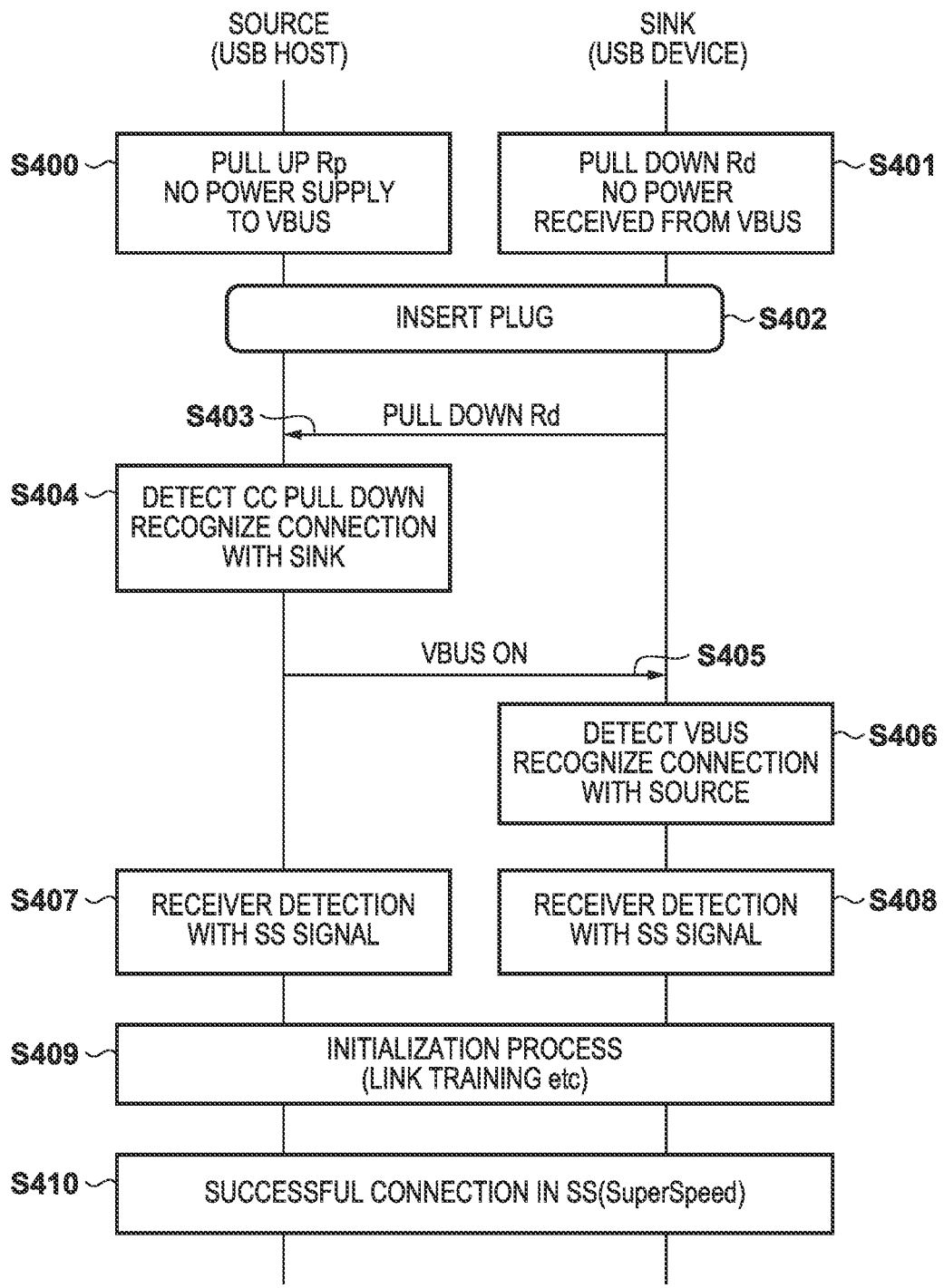

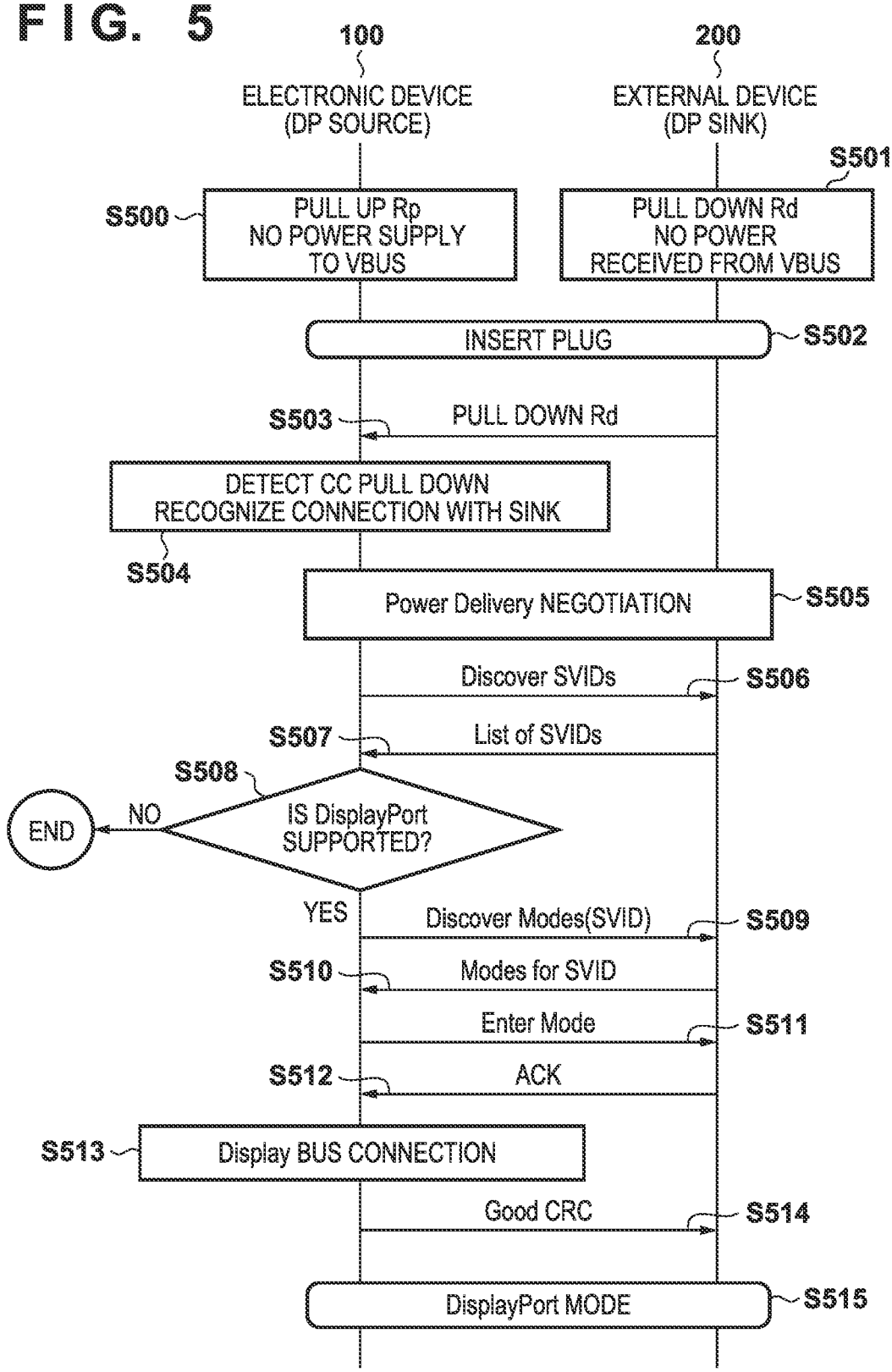

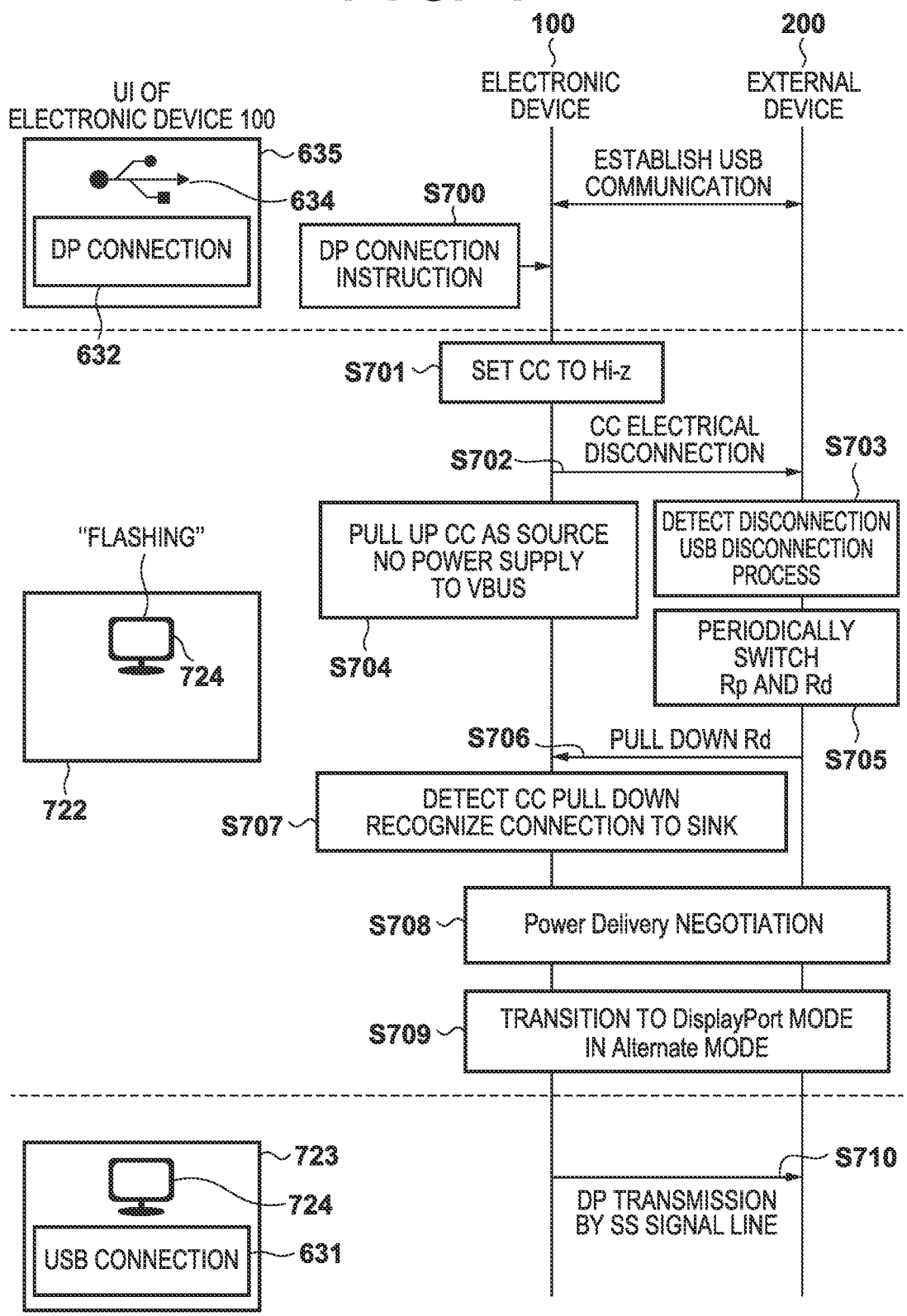

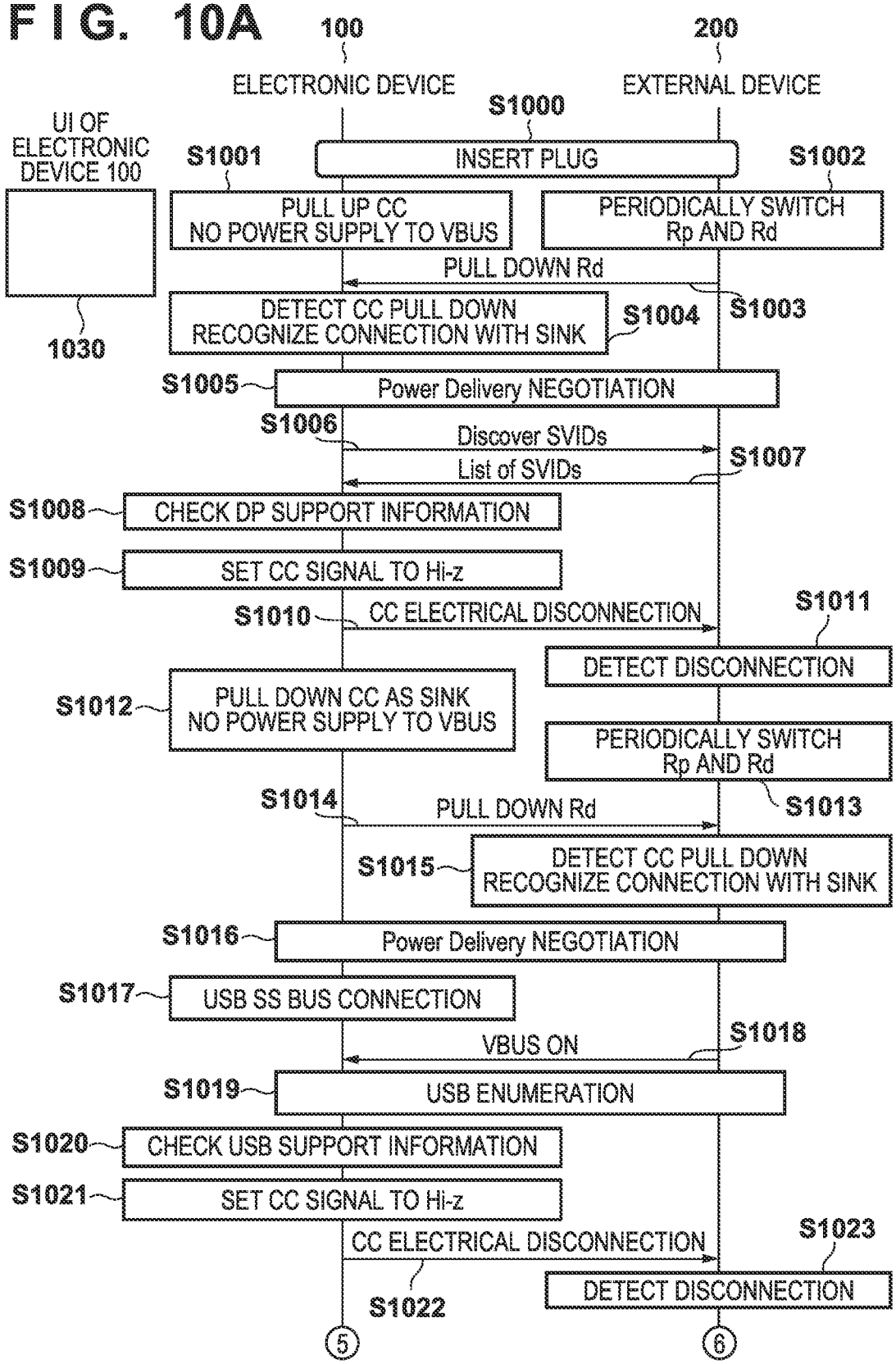

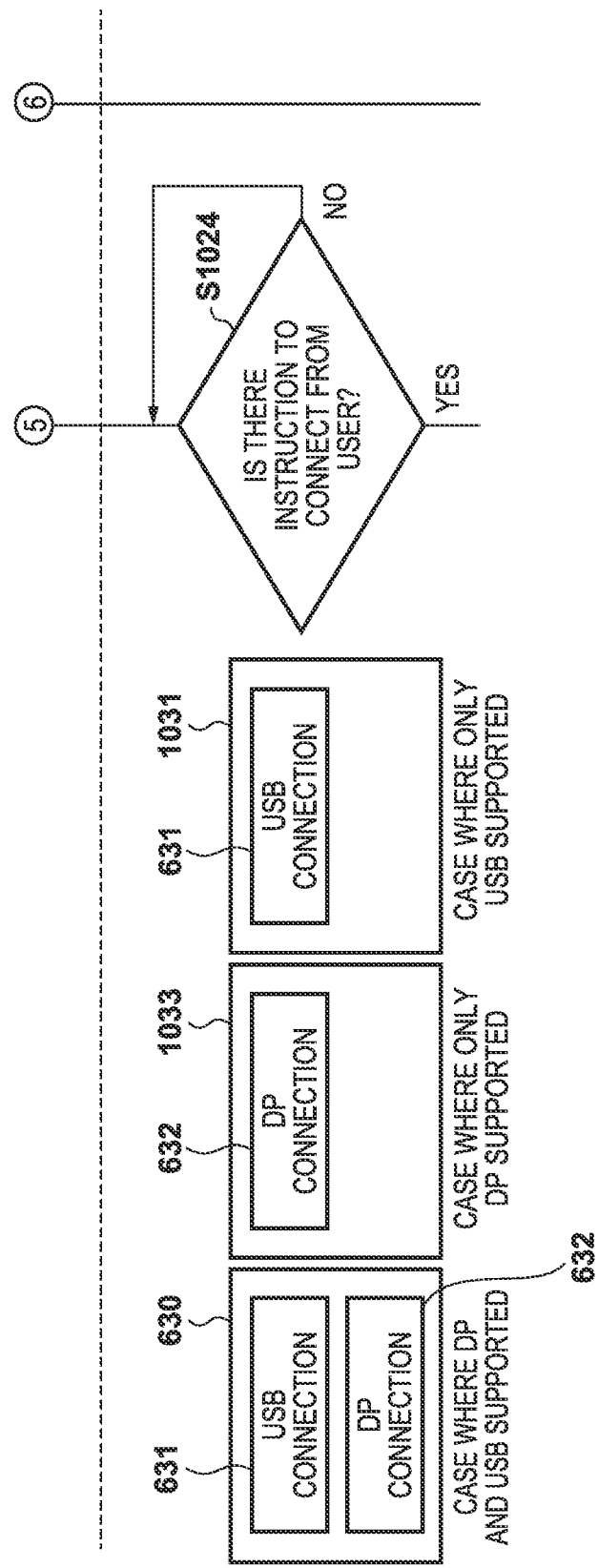

ELECTRONIC DEVICE AND CONTROL METHOD THEREOF

CROSS-REFERENCE TO RELATED APPLICATIONS

This application is a Continuation of International Patent Application No. PCT/JP2020/016324, filed Apr. 13, 2020, which claims the benefit of Japanese Patent Application No. 2019-087722, filed May 7, 2019, both of which are hereby incorporated by reference herein in their entirety.

BACKGROUND

Field of the Disclosure

Aspects of the disclosure generally relate to an electronic device, and a method of controlling the electronic device.

Background Art

It has been known that Alternate Mode allows communication compliant with a standard other than USB (non-USB communication) to be performed using a cable compliant with USB Type-C standard. Between devices that support Alternate Mode, communication compliant with USB standard and non-USB communication can be switched through a single interface (the same cable) (see Japanese Patent Laid-Open No. 2018-200345). Communication compliant with the DisplayPort (DP) standard (DP communication) is an example of non-USB communication capable of being performed using Alternate Mode.

To perform communication compliant with a certain standard between devices that support Alternate Mode, each device is required to have appropriate communication capability. For example, for DP communication, the two connected devices need to support the DP standard and one of the devices needs to be capable of acting as the source device (output device) according to the DP standard and the other device needs to be capable of acting as the sink device (input device) according to the DP standard. In a case where one of the devices does not support the DP standard and in a case where both of the devices are capable of acting as the source devices or the sink devices, DP communication cannot be performed.

However, conventional devices supporting alternate mode allow users to select the method of communication with the counterpart device based solely on their own communication capability. Thus, there is a case where communication with the counterpart device cannot be performed using the communication method selected by the user. In such a case, the user does not know that he/she selected communication method cannot be performed until communication with the counterpart device fails. Thus, there is room for improvement in usability.

SUMMARY

According to various embodiments, the usability of an electronic device that supports different communication standards can be improved.

According to various embodiments, there is provided an electronic device that includes: a communication unit that communicates with an external device using one of communication methods; a control unit that determines a communication method, from among the communication methods, unable to be used in communication with the external device; and a display unit that displays an user interface that is not capable of selecting the determined communication method.

According to various embodiments, there is provided a method that includes: determining a communication method, from among communication methods, unable to be used in communication with an external device; and causing a display unit of an electronic device to display a user interface that is not capable of selecting the determined communication method.

Further aspects of the disclosure will become apparent from the following description of example embodiments.

BRIEF DESCRIPTION OF THE DRAWINGS

FIG. 1 is a block diagram illustrating an example of the functional configuration of an electronic device 100 according to a first embodiment.

FIG. 2 is a diagram illustrating a connection configuration of an external device according to the first embodiment.

FIG. 3 is a sequence chart relating to the operation for detecting device connection according to the first embodiment.

FIG. 4 is a sequence chart relating to the process to establish communication in SS mode according to the first embodiment.

FIG. 5 is a sequence chart relating to the process to establish DP communication according to the first embodiment.

FIG. 7 is a sequence chart relating to the process to switch from USB communication to DP communication according to the first embodiment.

FIG. 10A is a sequence chart relating to the process to determine the communication capability of an external device according to a third embodiment.

FIG. 10B is a sequence chart relating to the process to determine the communication capability of the external device according to the third embodiment.

DESCRIPTION OF THE EMBODIMENTS

Figure 6A:
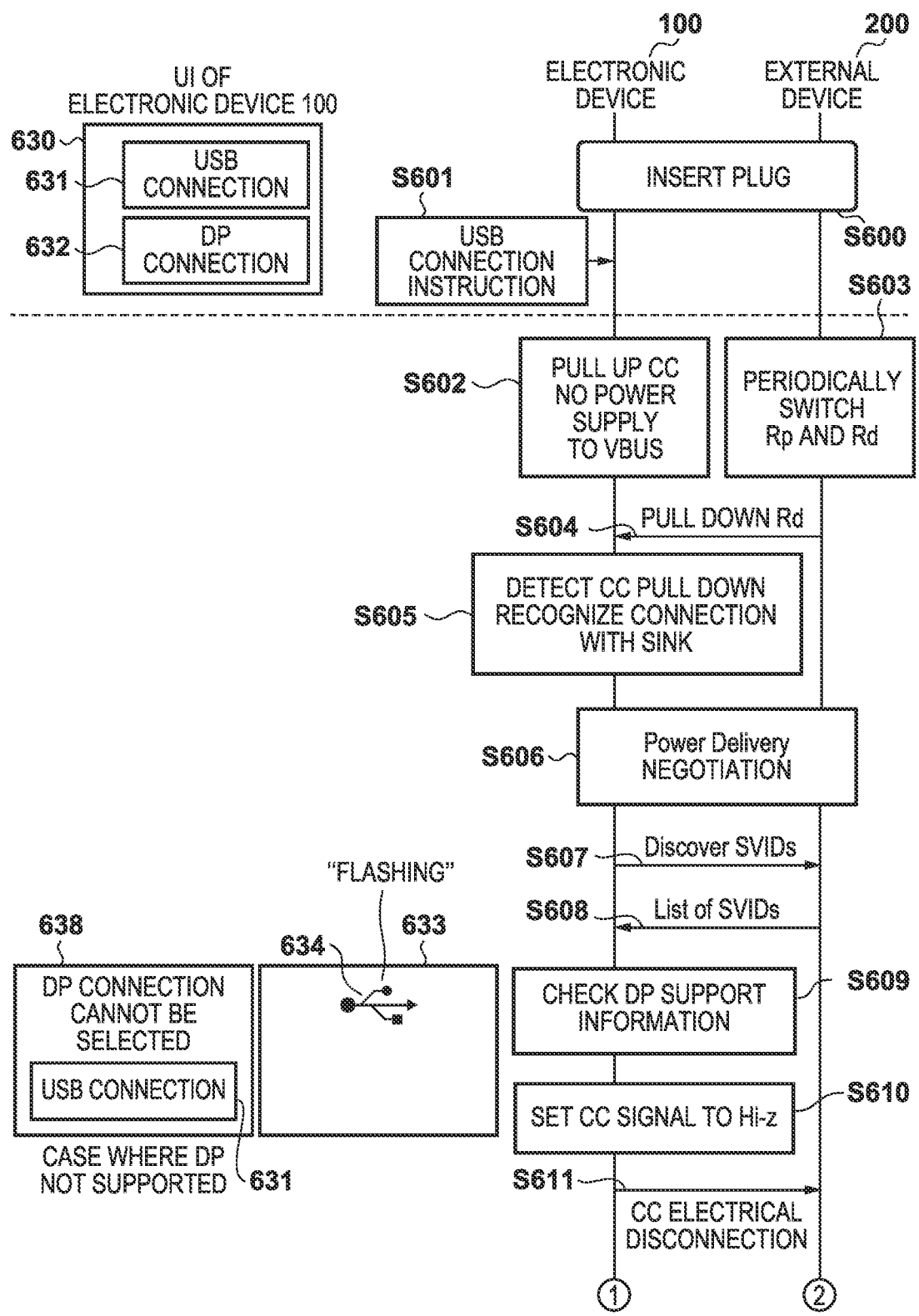
FIG. 6A is a sequence chart relating to the process to establish USB communication according to the first embodiment.

Example embodiments, features, and aspects of the disclosure will be described below with reference to the drawings. However, embodiments of the invention are not limited to the following example embodiments.

Note that in the embodiments described below, an Alternate Mode according to USB standard is used as an example of technology for enabling communication with an external device selectively using one of a communication method compliant with different standards using a single interface or cable. The embodiments described below can be applied to other technology that achieves a similar function. Note that the details of USB 3.1 standard, USB Type-C standard, and USB Power Delivery (PD) standard relating to the embodiments described below can be found in the respective specifications. Also, in the embodiments described below, a digital camera is used as an example of an electronic device. The electronic device in the embodiments described below may be a computer device, such as a personal computer, a smart phone, a tablet terminal, a game console, a media player, or the like, a robot, a vehicle, a home appliance, or the like.

First Embodiment

<Configuration of Digital Camera>

FIG. 1 is a block diagram illustrating an example of the functional configuration of an electronic device 100 according to a first embodiment.

A control unit 101 includes one or more programmable processors. The processor of the control unit 101 executes a program stored in a non-volatile memory 103 using a RAM 104 to control the operations of the units of the electronic device 100 and implement various functions of the electronic device 100. Hereinafter, unless specifically stated otherwise, the operations executed by the control unit 101 are to be understood as being implemented by the processor of the control unit 101 executing a program.

A bus 130 provides a communication path for the connected functional blocks to other functional blocks.

The non-volatile memory 103 stores a program executable by the processor of the control unit 101, various settings, GUI data, or the like. The RAM 104 is used in the execution of a program by the processor of the control unit 101. An SDRAM 105 is used as a buffer for image data, used for temporarily storing various information such as management information, or the like.

A media interface (IF) 108 is a communication interface with a storage medium 109. The media IF 108, in accordance with control by the control unit 101, transmits commands to the storage medium 109, transmits data to and receives data from the storage medium 109, or the like. The storage medium 109 is a memory card, for example.

An image capture unit 120 includes an imaging optical system (lens), a diaphragm, a shutter, an image sensor, and the like. The image capture unit 120, in accordance with control by the control unit 101, executes image capture operations and stores obtained RAW image data in the SDRAM 105 via the bus 130.

A developing unit 121 reads out the RAW image data stored in the SDRAM 105. Then, the developing unit 121 applies a development process to the read RAW image data. The development process includes, but is not limited to, a pixel interpolation process, a filter process, a resize process, a color conversion process, a signal format conversion process, or the like. The signal format conversion process is a process to convert from an RGB format to a YCbCr format, for example. The developing unit 121 stores the post-development processing image data in the SDRAM 105.

The control unit 101 reads out the post-development processing image data from the SDRAM 105. Then, the control unit 101 stores the data file of a predetermined format where the read image data is stored to the storage medium 109 via the media IF 108. The control unit 101 also reads out the image data from the data file stored in the storage medium 109 and stores this in the SDRAM 105.

A display control unit 106 reads out the post-development processing image data from the SDRAM 105. Then, the display control unit 106 generates image data for display from the read image data. The display control unit 106 generates image data for display by applying a scaling process suitable for the resolution of a display unit 107 to the image data, for example. The display control unit 106, for example, outputs the generated image data for display to the display unit 107, which is a touch display.

The display unit 107 displays an image based on the image data for display generated by the display control unit 106. Also, the display unit 107 displays a GUI including a menu screen, icons, software keys, or the like. The touch panel of the display unit 107 functions as an operation unit for the user to give instructions to the electronic device 100. Note that the electronic device 100 may include other input devices that function as operation units, such as a switch or buttons.

A USB Type-C receptacle 115 (hereinafter referred to as Type-C receptacle 115) is a receptacle compliant with the USB Type-C standard. The Type-C receptacle 115 mates with a Type-C plug provided on a USB cable or the like. The control unit 101 can communicate with an external device via the Type-C receptacle 115 using various standards and at various speeds. Controllers 110 to 113 for USB communication and non-USB communication and a disconnection unit 117 are connected to the Type-C receptacle 115.

The control unit 101 uses the USB 3.1 controller 111 (hereinafter, also referred to as SS 111) in a case of USB communication with an external device via SuperSpeed (SS) mode. Also, the control unit 101 uses the USB 2.0 controller 110 (hereinafter, also referred to as NSS 110) in a case of USB communication with an external device via the speed mode of up to USB 2.0 (Non-SuperSpeed (NSS) mode). NSS mode includes a High-Speed mode, a Full-Speed mode, and a Low-Speed mode. The control unit 101 uses the Display controller 112 (hereinafter, also referred to as DP 112) in a case of DP communication compliant with the DisplayPort standard, i.e., non-USB communication, with an external device.

The PD controller 113, in accordance with control by a switching unit 116, controls the start and stop of Alternate Mode according to a sequence set by the USB PD standard.

A multiplexer (MUX) 114, in accordance with control by the switching unit 116, selectively connects a signal line of the SS 111 or a signal line of the DP 112 to the Type-C receptacle 115.

The switching unit 116, in accordance with control by the control unit 101, controls the PD controller 113 and the MUX 114. The control unit 101 communicates with an external device through the switching unit 116 and with an external device through a configuration channel (CC). The switching unit 116 controls the switching between the USB communication and the non-USB communication in Alternate Mode.

The disconnection unit 117 is selectively connected to the CC of the USB Type-C receptacle 115 and disconnects communications with an external device. The control unit 101 controls the connection and canceling of connection of the disconnection unit 117.

A mode acquisition unit 119 controls the PD controller 113 and detects whether or not an external device supports the DisplayPort standard using a sequence of the USB PD standard.

<Connection Configuration>

FIG. 2 is a diagram schematically illustrating the signal lines and channels when the electronic device 100 and an external device 200 are connected via a USB Type-C standard connector. Here, the external device 200 is a display device that supports DisplayPort over USB-C (or DP Alt Mode), for example. The external device 200 includes a Type-C receptacle 210 similar to the Type-C receptacle 115 of the electronic device 100.

D+/D− 201 is used in NSS mode USB communication by the USB 2.0 controller 110. SS TX/RX 202 is used in SS mode USB communication by the USB 3.1 controller. In Alternate Mode, the SS TX/RX 202 is also used in DP communication using the DP controller 112. A VBUS 203 is a 5 V power supply line. A configuration channel (CC) 204 is used for detecting, setting up, and managing the connection with the external device.

<Connection Detection>

With the USB Type-C standard, when a pull-up resistor Rp or a pull-down resistor Rd is connected to CC1, CC2, the connection and/or function of the device is recognized, and displayed on the counterpart device, for example.

Specifically, the pull-up resistor Rp connects to the CC of the source device, and the pull-down resistor Rd connects to the CC of the sink device. Note that the source device is a device that detects a connection, and the sink device is a device for which connection is detected. Detailed resistance values for the pull-up resistor Rp and the pull-down resistor Rd are specified in the standard.

Next, a connection detection sequence of the source device (hereinafter, referred to as source) and the sink device (hereinafter, referred to as sink) will be described using the sequence chart of FIG. 3. Also, here, the electronic device 100 is the source and the external device 200 is the sink.

In step S300, the control unit 101 controls the USB 2.0 controller 110 and the CC1, CC2 of the Type-C receptacle 115 is pulled up with Rp. Also, the control unit 101 executes control so that the USB 2.0 controller 110 does not supply power to the VBUS of the Type-C receptacle 115.

In step S301, the external device 200 pulls down the CC1, CC2 of the Type-C receptacle 210 to Rd. Also, because the electronic device 100 is not supplying power at this stage, power supply at the VBUS of the Type-C receptacle 210 is not detected.

In step S302, the plug of a USB Type-C cable is inserted into the Type-C receptacle 115, 210 of the electronic device 100 and the external device 200.

Accordingly, in S303, the CC1, CC2 are electrically connected between the electronic device 100 and the external device 200, and the CC1, CC2 of the Type-C receptacle 115 are connected to the pull-down resistor Rd in the external device 200.

In step S304, the USB 2.0 controller 110 detects that the CC1, CC2 are being pulled down with Rd and via this recognizes that a connection to the sink (the external device 200) has been made.

In step S305, the control unit 101 controls the USB 2.0 controller 110 and starts supplying power to the VBUS of the Type-C receptacle 115.

In step S306, the external device 200 detects the power supply to the VBUS of the Type-C receptacle 210. In this manner, the external device 200 recognizes that a connection to the source (the electronic device 100) has been made.

<Connection Sequence in SS Mode>

Next, a connection sequence in SS mode according to the USB Type-C standard will be described using the sequence chart of FIG. 4. Also, here, the electronic device 100 is the source and a USB host and the external device 200 is the sink and a USB device.

The processes of steps S400 to S406 of FIG. 4 are similar to the processes of steps S300 to S306 of FIG. 3, and thus a description thereof will be omitted.

In step S407, the control unit 101 controls the USB 3.1 controller 111 and causes it to execute a receiver detection operation using a SuperSpeed (SS) signal. In step S408, a similar operation to that executed in step S407 is executed for the external device 200.

By executing the receiver detection process, the electronic device 100 and the external device 200 both detect the electrical connection with the counterpart device.

In step S409, the electronic device 100 and the external device 200 execute a link initialization process at the SS link, and in step S410, an SS mode connection is established.

<DP Communication Sequence in Alternate Mode>

Next, a non-USB communication (DP Alt mode) connection sequence using Alternate Mode between the electronic device 100 and the external device 200 will be described using the sequence chart of FIG. 5. The electronic device 100 is the source and the external device 200 is the sink.

The processes of steps S500 to S504 are similar to the processes of steps S300 to S304 of FIG. 3, and thus a description thereof will be omitted.

In step S505, the control unit 101 controls the PD controller 113 and executes a negotiation (power negotiation) relating to power supply with the external device 200 via the CC. In the negotiation, the control unit 101 and the external device 200 perform a start of packet (SOP) communication as defined in by the USB PD standard. Via the negotiation, the control unit 101 and the external device 200 determine the settings relating to power supply, such as maximum current, operation current, VBUS power supply direction, and the like. The detailed process of the negotiation is listed in the standard, and thus a more detailed description thereof is omitted. Also, in a case where the source or the sink do not support the negotiation relating to power supply, the process of step S505 may be omitted.

In step S506, the control unit 101 controls the mode acquisition unit 119 and transmits a Discover SVIDs command to the external device 200 via the CC. The Discover SVIDs command is a command for acquiring a list of the Standard or Vendor IDs the counterpart device supports.

In step S507, the external device 200 transmits back a list of the supported SVIDs.

In step S508, the control unit 101 checks whether a DisplayPort VID (FF01h) is in the SVID list received in step S507. In a case where a DisplayPort VID is found, the control unit 101 determines that the external device 200 supports the DisplayPort standard. On the other hand, in a case where a DisplayPort VID is not found in the SVID list received from the external device 200, the control unit 101 determines that the external device that does not support the DisplayPort standard and ends a connection process.

In step S509, the control unit 101 controls the switching unit 116 and transmits a Discover Modes command specifying a DisplayPort VID to the external device 200.

In step S510, the external device 200 transmits back a list of the modes of the SVIDs specified in the Discover Modes command.

In step S511, the control unit 101 controls the switching unit 116 and transmits an Enter Mode command specifying one mode received in step S510 to the external device 200.

In step S512, the external device 200 transmits back a reply message (ACK) affirming transition to the specified mode.

In step S513, the control unit 101 controls the switching unit 116 and sets the MUX 114 to a state in which four signal lines of the DP 112 connect to four SS signal lines of the USB Type-C receptacle 115.

In step S514, the control unit 101 controls the switching unit 116 and transmits a Good CRC command. The Good CRC command is a message for indicating the successful receipt of the message immediately prior. Thus, in a case where the external device 200 receives the Good CRC command transmitted in step S514, the external device 200 recognizes the successful receipt of the ACK transmitted in step S512.

In step S515, the electronic device 100 and the external device 200 transition to Alternate Mode. Hereinafter, communication compliant with the DisplayPort standard (DP communication) is performed between the electronic device 100 and the external device 200.

Note that the commands described above are implemented using messages known as vendor defined messages (VDM). Specifically, a command represents a numerical value specified in the command field (Bit 4 . . . 0) of the VDM header included in the VDM. The numerical values of the commands are as follows.

Discover SVIDs=2
Discover Modes=3
Enter Mode=4

The format of the VDM header is listed in the USB PD standard, and thus a more detailed description thereof is omitted.

The electronic device 100 of the first embodiment supports Alternate Mode and is capable of USB communication and DP communication. Also, in DP communication, the electronic device 100 functions as the source device (output device). In a case where the external device is connected via the Type-C receptacle 115, the control unit 101 causes the display unit 107 to display a menu screen where the user selects whether to use USB communication or DP communication with the external device. Then, the control unit 101 executes a process to establish a connection with the external device using the communication method, from among the communications, selected from the menu screen by the user.

In the next example, with the communication with the external device established using a first communication method (standard), the user gives an instruction to change to a second communication method. The control unit 101 controls the PD controller 113 and the switching unit 116 to execute an Alternate Mode mode change or end process and attempts to establish communication using the second communication method. However, in some cases, the external device 200 may not support the second communication method. Also, even if the external device 200 supports the second communication method, if the relationship between devices (source/sink relationship, USB host/USB device relationship) is not satisfied, communication using the second communication method cannot be established.

In such cases, from when the switch to the second communication method starts until when communication is reestablish using the first communication method after the connection establishment failure, communication using the first communication method are disconnected. Thus, in addition to making the user perform an unnecessary switching operation, unnecessary communication disconnection and reestablishment are also performed. Thus, there is room for improvement in terms of usability and power consumption reduction.

For example, in a case where the external device 200 is a display device that supports DP Alt Mode, the external device 200 is capable of DP communication using Alternate Mode, but may not have USB communication functionality. This is because devices that support Alternate Mode need to be compliant with the USB PD standard, but data communication functionality is not mandatory in the USB PD standard. Also, in a case where the external device is a smart phone or a tablet terminal, even if the external device supports USB communication, it may not support DP communication. Furthermore, even if the external device 200 supports DP communication, in a case where the external device 200 is only capable of acting as the source device, the electronic device 100 is not allowed to operate as the source device in DP communication.

Thus, in the first embodiment, the options for the communication methods able to be selected by the user are changed depending on the communication capability of the connected external device. This can help prevent the user giving unnecessary instructions to switch to a communication method and help prevent unnecessary processes being performed. The operations for implementing such operations will be described below.

<Connection with External Device Operation>

The operation executed when the electronic device 100 according to the first embodiment establishes USB communication with the external device 200 will now be described with reference to the sequence charts of FIGS. 6A and 6B.

In step S600, the plug of a Type-C cable is inserted into the Type-C receptacle 115, 210 of the electronic device 100 and the external device 200. When the insertion of the plug into the Type-C receptacle 115 is detected, the control unit 101 controls the display control unit 106 and causes the display unit 107 to display a communication method selection screen 630. The selection screen 630 is a user interface for the user to select the communication method.

The selection screen 630 includes a USB connection icon 631 for giving USB communication as the instruction for the method of communicating with the external device 200 and a DP connection icon 632 for giving DP communication as the instruction. The USB connection icon 631 and the DP connection icon 632 both function as software keys. When a touch operation on a region corresponding to an icon is detected on the display unit 107, which is a touch display, the control unit 101 recognizes this as a selection operation of the icon. For example, in a case where the user wants to transfer image data to a PC, the user can select USB communication, and in a case where the user wants to perform mirroring of the display of the display unit 107 on an external display device, the user can select DP communication. In the following example, the user selects (touches) the USB connection icon 631 and USB communication is performed.

In step S601, the control unit 101 detects that the USB connection icon 631 on the selection screen 630 has been selected.

In step S602, the control unit 101, in order to indicate to the external device 200 that itself is a source (power supplying device) according to the USB PD standard, controls a connection unit 118 and connects the pull-up resistor Rp to the CC1, CC2 of the Type-C receptacle 115. At this point, the control unit 101 does not supply power to the VBUS of the Type-C receptacle 115.

Also, to inform the user that the USB connection process is in progress during the time from step S602 to step S620, the control unit 101 controls the display control unit 106 and causes it to display, instead of the selection screen 630. a process in progress screen 633 including an icon. Note that to make it obvious that a process is in progress, the control unit 101 may cause the icon on the process in progress screen 633 to flash.

In the following example, the external device 200 is a device that supports Dual-Role-Power (DRP) and is capable of acting as either a source or a sink. In this case, the external device 200 alternately connects the pull-down resistor Rd and the pull-up resistor Rp to the CC1, CC2 of the Type-C receptacle 210 for a tDRP period (minimum 50 ms to maximum 10 ms) (step S603).

In step S604, the external device 200 is in a state with the resistor Rd connected to the Type-C receptacle 210.

In step S605, the control unit 101 detects the pull down of the CC, and thus recognizes that the sink (the external device 200) has been connected.

In step S606, in a similar manner to step S505, the control unit 101 controls the PD controller 113 and executes a negotiation relating to power supply according to the USB PD standard with the external device 200.

The processes of steps S607 and S608 is similar to the processes of steps S506 and S507. With this process, the control unit 101 acquires a list of SVIDs the external device 200 supports.

In step S609, the control unit 101 determines whether or not a DisplayPort VID (FF01h) is in the acquired SVID list. Then, the control unit 101 stores the determination result as data relating to the communication capability of the external device in the RAM 104. Here, if there is a DisplayPort VID, the control unit 101 determines that the external device 200 is a device that supports DP communication, and if there is no DisplayPort VID, the control unit 101 determines that the external device 200 is a device that does not support DP communication.

The process from step S602 to step S609 is a process for determining whether or not DP communication can be performed with the external device 200. In USB communication, the electronic device 100 functions as the device. Also, the device functioning as the device in USB communication is required to function as the sink in USB PD. Thus, to re-set the electronic device 100 as a sink, the USB PD process is executed again.

In step S610, the control unit 101 connects the disconnection unit 117 to the CC1, CC2 of the Type-C receptacle 115 and puts the CC in a high impedance state (Hi-z). By this, the CC is put in an electrically disconnected state (step S611).

In step S612, the external device 200 detects the communication disconnection and executes a disconnection process.

In step S613, the control unit 101 controls the connection unit 118 and, to indicate that itself is a sink, connects the pull-down resistor Rd to the CC1, CC2 of the Type-C receptacle 115.

In step S614, in a similar manner to step S603, the external device 200 periodically switches the resistor connecting to the Type-C receptacle 210.

At the time of step S615, the external device 200 detects that the CC is pulled down during the time the resistor Rd is connected to the Type-C receptacle 210.

In step S616, the external device 200 recognizes that the sink has been connected. Then, in order for it to function as the source, the external device 200 fixes the resistor connecting to the Type-C receptacle 210 as the pull-up resistor Rp.

Step S617, in a similar manner to step S606, is a negotiation process relating to power supply. However, the relationship between the source and the sink is the reverse of that in step S606.

In step S618, the control unit 101 controls the switching unit 116 and sets the MUX 114 to a state in which four signal lines of the SS 111 connect to four SS signal lines of the USB Type-C receptacle 115.

In step S619, the external device 200 starts supplying power to the VBUS of the Type-C receptacle 210.

In step S620, the electronic device 100 and the external device 200 execute USB enumeration. In this process, the external device 200 operates as the USB host and the electronic device 100 operates as the USB device. Via USB enumeration, the host can communicate with the device.

In step S621, a USB connection between the electronic device 100 and the external device 200 is established.

In step S622, the control unit 101 changes, based on the determination result of step S609 or the list acquired in step S608, the contents displayed on the communication method selection screen to be displayed when the external device 200 is connected. Note that the control unit 101 may display the communication method selection screen in response to a user instruction or, after communication is established in step S621, may continuously display the selection screen while communication is maintained. In the latter case, the selection screen also functions as a confirmation screen of the currently connected communication method.

Specifically, the control unit 101 references the data relating to the communication capability of the external device stored in the RAM 104 when the selection screen is displayed. Then, the control unit 101 changes the contents of the selection screen not to display the communication methods that the external device 200 does not support (or communication methods that cannot be performed with the external device 200) on the display unit 107.

A selection screen 635 displayed in a case where DP communication can be performed with the external device 200 includes a USB icon 634, which is an example of information indicating the currently established communication method, and the DP connection icon 632 for giving an instruction to switch to DP communication. A selection screen 636 displayed in a case where DP communication cannot be performed with the external device 200 includes the USB icon 634 but does not include the DP connection icon 632.

Note that the case where DP communication cannot be performed includes a case where the external device 200 does not support the DisplayPort standard and a case where the external device 200 is only capable of acting as a source. In a case where the external device 200 is only capable of acting as a source, in step S603, the CC of the Type-C receptacle 210 is pulled up. Thus, the control unit 101 cannot detect the CC of the Type-C receptacle 115 being pulled down in step S605. Accordingly, in a case where the control unit 101 cannot detect the CC being pulled down after a certain amount of time (for example, 5 seconds) has passed since the CC of the Type-C receptacle 115 was pulled up in step S602, the control unit 101 determines that the external device 200 is a device that does not support DP communication. Then, the process proceeds to step S609, and the determination result is stored in the RAM 104 as data relating to the communication capability of the external device. In this manner, even in a case where the external device 200 is only capable of acting as a source, a process can be executed in a similar manner to a case where the external device 200 does not support DP communication.

Note that even in a case where the user selection of the DP connection icon 632 is detected in step S601, the control unit 101 executes steps S602 to S609. Also, in a case where the external device 200 is determined to be incapable of DP communication, the control unit 101 controls the display control unit 106 and causes the display unit 107 to display a screen 638, for example. The screen 638 includes an error message informing the user that the external device cannot communicate with the selected communication method and an icon for selecting another communication method. Here, because the external device 200 is incapable of DP communication. the USB connection icon 631 is displayed.

However, in a case where the external device 200 is capable of DP communication, the control unit 101, following on from step S609, executes an operation to switch to Alternate Mode for DP communication. In a similar manner to steps S509 to S514 of FIG. 5, the control unit 101 can execute this switching operation.

<Operation for Switching from USB Communication to Non-USB Communication>

Next, the operation executed when the communication method between the electronic device 100 and the external device 200 is switched from USB communication to non-USB communication (DP communication in this example) will be described using the sequence chart illustrated in FIG. 7. FIG. 7 corresponds to the operation executed after the electronic device 100 and the external device 200 have established USB communication via the sequence illustrated in FIGS. 6A and 6B.

When an instruction to display the communication method selection screen is detected while USB communication is established, the control unit 101 controls the display control unit 106 and causes it to display the communication method selection screen on the display unit 107. In this example, the external device 200 has been confirmed to be capable of DP communication prior to the establishment of USB communication. In this case, the control unit 101 causes the selection screen 635 illustrated in FIG. 6B to be displayed on the display unit 107.

In step S700, the control unit 101 detects that the DP connection icon 632 on the selection screen 635 has been selected.

In step S701, the control unit 101 connects the disconnection unit 117 to the CC1, CC2 of the Type-C receptacle 115 and puts the CC in a high impedance state (Hi-z). By this, the CC is put in an electrically disconnected state (step S702).

Also, to inform the user that the DP connection process is in progress during the time from step S701 to step S709, the control unit 101 controls the display control unit 106 and causes it to display, instead of the selection screen 635, a process in progress screen 722 including an icon. Note that to make it obvious that a process is in progress, the control unit 101 may cause the icon on the process in progress screen 722 to flash.

In step S703, the external device 200 detects the USB communication disconnection and executes a disconnection process.

In step S704, the control unit 101 controls the connection unit 118 and, to indicate that itself is a source, connects the pull-up resistor Rp to the CC1, CC2 of the Type-C receptacle 115. At this point, the control unit 101 does not supply power to the VBUS of the Type-C receptacle 115.

In step S705, in a similar manner to step S603, the external device 200 periodically switches the resistor connecting to the Type-C receptacle 210.

In step S706, the external device 200 is in a state with the resistor Rp connected to the Type-C receptacle 210.

In step S707, the control unit 101 detects the pull down of the CC, and thus recognizes that the sink (the external device 200) has been connected.

In step S708, in a similar manner to step S505, the control unit 101 controls the PD controller 113 and executes a negotiation relating to power supply according to the USB PD standard with the external device 200.

In step S709, the control unit 101 exchanges messages with the external device 200 and transitions to Alternate Mode for DP communication. The operation for transitioning to Alternate Mode is similar to the operation described in steps S509 to S514 of FIG. 5, and thus description thereof is omitted.

In step S710, the control unit 101 controls the DP 112 and starts DP communication using an SS signal.

Also, when DP communication is enabled in step S709. the control unit 101 controls the display control unit 106 and may cause a communication method selection screen 723 to be displayed on the display unit 107. The selection screen 723 includes a DP icon 724, which is an example of information indicating the currently established communication method, and the USB connection icon 631 for giving an instruction to switch to USB communication.

Note that in step S700, in cases such as where data is currently being transferred between the electronic device 100 and the external device 200 via USB communication, it may not be desirable for the USB communication to be disconnected. In such cases, the control unit 101 may not display a DP connection icon 721 together with the communication method selection screen 635 (or make the DP connection icon 721 displayed together with the selection screen 635 unselectable). Thereafter, when data transfer is complete or other such state where the USB communication may be disconnected, the control unit 101 displays the DP connection icon 721 together with the selection screen 635, or makes the DP connection icon 721 displayed together with the selection screen 635 selectable.

According to the first embodiment, with an electronic device capable of selectively performing communication compliant with a standard different from that of an external device using a single interface, before starting communication compliant with a first standard with the external device, whether or not communication compliant with a second standard is possible is checked. Then. the display of a communication method selection screen is changed according to the check results so that communication methods that cannot be performed are unselectable. This prevents the user from selecting a communication method that the currently connected external device cannot perform, thus improving the usability of the electronic device. Also, because unnecessary disconnection and reconnection of the currently established connection is avoided, interruptions to communication and wasteful power consumption can be minimized or prevented.

Note that in the first embodiment described above, an electronic device functions as a USB device and is capable of connecting to an external device functioning as a USB host. However, the first embodiment may also be applied to an electronic device that operates as a USB host.

Also, in the first embodiment described above, the non-USB communication performed in Alternate Mode is DP communication compliant with the DisplayPort standard. However, the first embodiment is not dependent on the type of non-USB communication. For example, non-USB communication compliant with another standard such as HDMI (registered trademark) may be performed with the external device.

Second Embodiment

Next, a second embodiment will be described. In a similar manner to the first embodiment, the second embodiment can be implemented using the electronic device 100 and the external device 200, and thus the description of common configurations and operations are omitted. In the first embodiment, whether or not DP communication is possible with the external device is checked before establishing USB communication for cases where an instruction is received to execute USB communication w % bile a connection with the external device is active. In the second embodiment, whether or not USB communication is possible with the external device is checked before establishing DP communication for cases where an instruction is received to execute DP communication while a connection with the external device is active.

<Connection with External Device Operation>

Figure 8A:
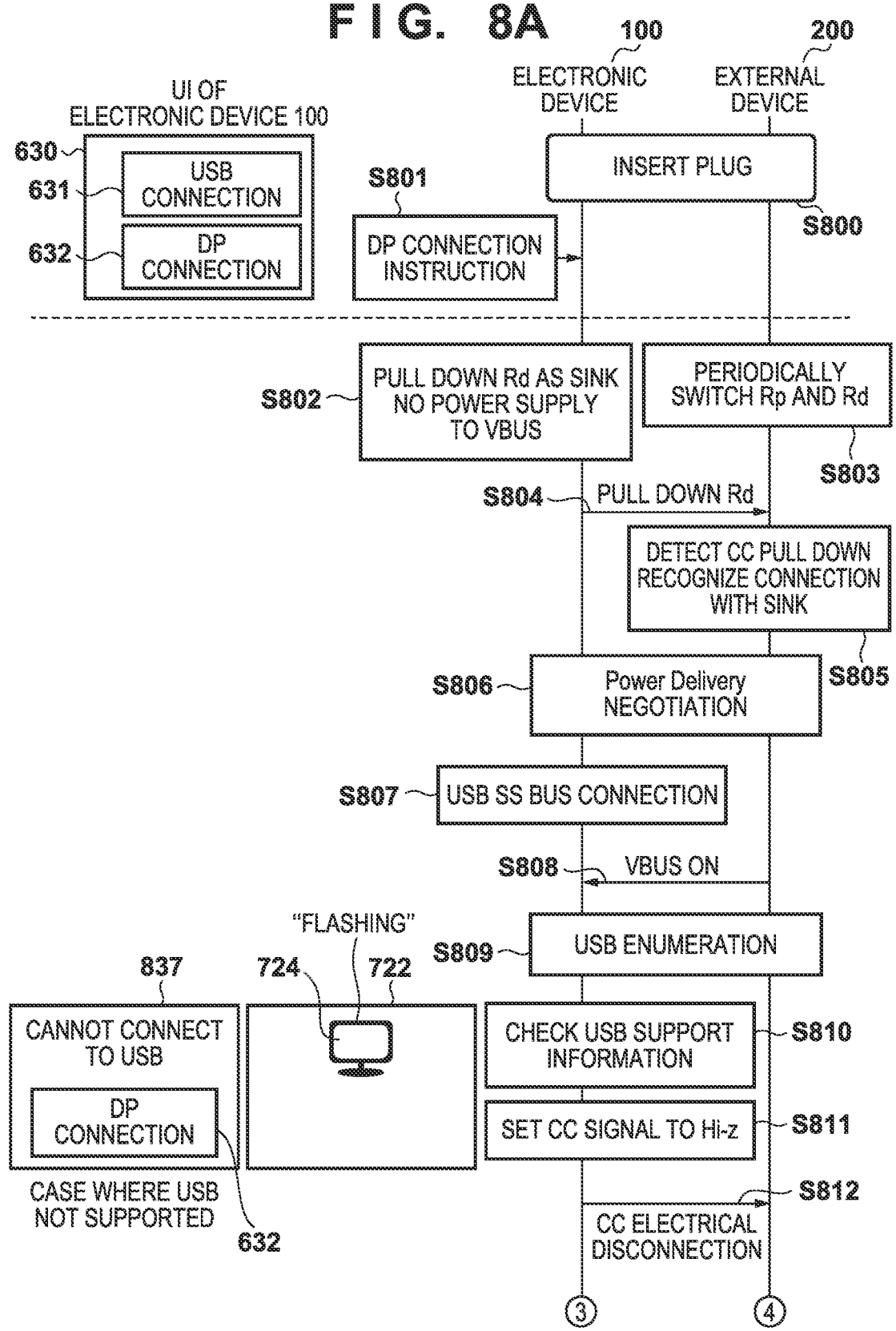
FIG. 8A is a sequence chart relating to the process to establish DP communication according to a second embodiment.
Figure 8B:
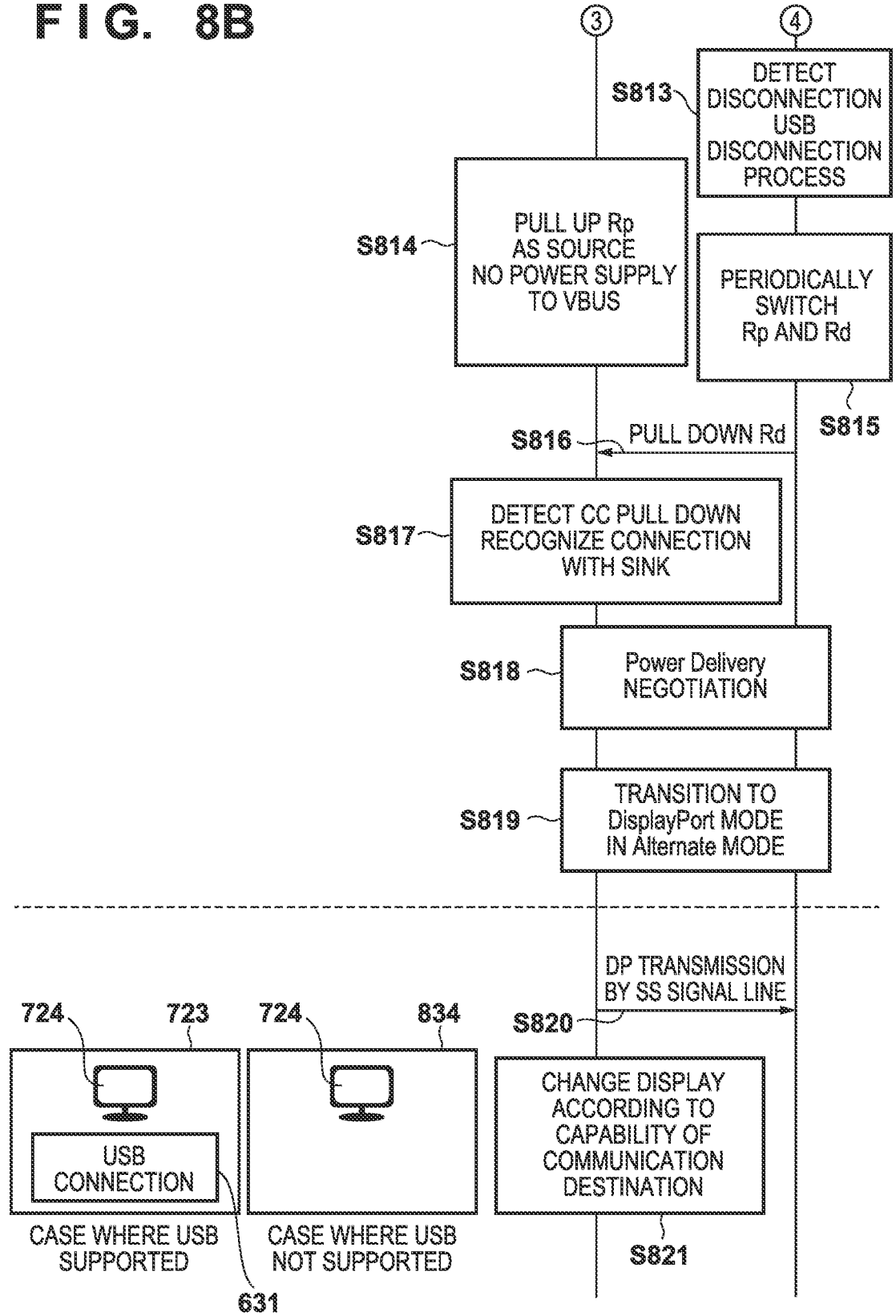
FIG. 8B is a sequence chart relating to the process to establish DP communication according to the second embodiment.

The operation executed when the electronic device 100 according to the second embodiment establishes DP communication with the external device 200 will now be described with reference to the sequence charts of FIGS. 8A and 8B.

In step S800, the plug of a Type-C cable is inserted into the Type-C receptacle 115, 210 of the electronic device 100 and the external device 200. When the insertion of the plug into the Type-C receptacle 115 is detected, the control unit 101 controls the display control unit 106 and causes the display unit 107 to display the communication method selection screen 630. The selection screen 630 includes the USB connection icon 631 for giving USB communication as the instruction for the method of communicating with the external device 200 and the DP connection icon 632 for giving DP communication as the instruction.

In step S801, the control unit 101 detects that the DP connection icon 632 on the selection screen 630 has been selected.

In step S802, the control unit 101 controls the connection unit 118 and, to indicate to the external device 200 that itself is a sink according to the USB PD standard, connects the pull-down resistor Rd to the CC1, CC2 of the Type-C receptacle 115.

Also, to inform the user that the DP connection process is in progress during the time from step S802 to step S819, the control unit 101 controls the display control unit 106 and causes it to display, instead of the selection screen 630, the process in progress screen 722 including the DP icon 724. Note that to make it obvious that a process is in progress, the control unit 101 may cause the DP icon 724 on the process in progress screen 722 to flash.

In step S803, the external device 200 alternately connects the pull-down resistor Rd and the pull-up resistor Rp to the CC1, CC2 of the Type-C receptacle 210 for a tDRP period (minimum 50 ms to maximum 100 ms).

In step S804, during the time the resistor Rp is connected to the Type-C receptacle 210 at the external device 200, the CC is being pulled down at the electronic device 100.

In step S805, the external device 200 detects the pull down of the CC, and thus recognizes that the sink (the electronic device 100) has been connected.

In step S806, the external device 200 executes a negotiation relating to power supply according to the USB PD standard with the electronic device 100. This process is similar to the process executed by the control unit 101 in step S505. Via the negotiation, the settings relating to power supply between the external device 200 and the electronic device 100 are confirmed.

In step S807, the control unit 101 controls the switching unit 116 and sets the MUX 114 to a state in which four signal lines of the SS 111 connect to four SS signal lines of the USB Type-C receptacle 115.

In step S808, the external device 200 starts supplying power to the VBUS of the Type-C receptacle 210.

In step S809, the electronic device 100 and the external device 200 execute USB enumeration. In this process, the external device 200 operates as the USB host and the electronic device 100 operates as the USB device.

In step S810, the control unit 101 determines whether the external device 200 is operating as an USB host. Then, the control unit 101 stores the determination result as data relating to the communication capability of the external device in the RAM 104. For example, in a case where the external device 200 is properly communicating as a USB host in the USB enumeration of step S809, the control unit 101 determines that the external device 200 is operating as the USB host. Also, for example, the control unit 101 may determine that the external device 200 is operating as the USB host, based on the reception of a specific command (a GetDescriptor command, for example) from the external device 200.

Note that in a case where the external device 200 is only capable of acting as a sink, the CC is pulled down in step S803. Thus, the external device 200 cannot detect the pull down of the CC in step S805. Accordingly, in a case where the control unit 101 cannot start a power supply negotiation after a certain amount of time (for example, 5 seconds) has passed since the CC was pulled up in step S802, the control unit 101 determines that the external device 200 is a device that does not support USB communication. Then, the process proceeds to step S810, and the control unit 101 stores the determination result in the RAM 104 as data relating to the communication capability of the external device. In this manner, even in a case where the external device 200 is only capable of acting as a sink, a process can be executed in a similar manner to a case where the external device 200 does not support USB communication.

The process from steps S802 to S810 is a process for determining whether or not the external device 200 has USB communication functionality (whether or not USB communication is possible with the external device 200). Thus, when this determination is complete, the control unit 101 re-executes the USB PD process for starting DP communication.

In step S811, the control unit 101 connects the disconnection unit 117 to the CC1, CC2 of the Type-C receptacle 115 and puts the CC in a high impedance state (Hi-z). By this, the CC is put in an electrically disconnected state (step S812).

In step S813, the external device 200 detects the communication disconnection and executes a disconnection process.

In step S814, the control unit 101 controls the connection unit 118 and, to indicate that itself is a source. connects the pull-up resistor Rp to the CC1, CC2 of the Type-C receptacle 115. At this point, the control unit 101 does not supply power to the VBUS.

In step S815, in a similar manner to step S803, the external device 200 periodically switches the resistor connecting to the Type-C receptacle 210.

In step S816, the external device 200 is in a state with the pull-down resistor Rd connected to the Type-C receptacle 210.

In step S817, the control unit 101 detects the pull down of the CC, and thus recognizes that the sink (the external device 200) has been connected.

In step S818, in a similar manner to step S505, the control unit 101 controls the PD controller 113 and executes a negotiation relating to power supply according to the USB PD standard with the external device 200. Via the negotiation, the settings relating to power supply between the electronic device 100 and the external device 200 are confirmed.

In step S819, the control unit 101 exchanges messages with the external device 200 and transitions to Alternate Mode for DP communication. The operation for transitioning to Alternate Mode is similar to the operation described in steps S509 to S514 of FIG. 5, and thus description thereof is omitted.

In step S820, the control unit 101 controls the DP 112 and starts DP communication using an SS signal.

In step S821, the control unit 101 changes, based on the determination result of step S810, the contents displayed on the communication method selection screen to be displayed when the external device 200 is connected. Note that the control unit 101 may display the communication method selection screen in response to a user instruction or, after communication is established in step S820, may continuously display the selection screen while communication is maintained. In the latter case, the selection screen also functions as a confirmation screen of the currently connected communication method.

Specifically, when displaying the selection screen, the control unit 101 references the information of the communication method that the external device does not support, stored in the RAM 104. Then, the control unit 101 changes the contents of the selection screen not to display the communication methods that the external device 200 does not support (or communication methods cannot be performed with the external device 200 execute) on the display unit 107.

The selection screen 723 displayed in a case where the external device 200 is capable of USB communication includes the DP icon 724, which is an example of information indicating the currently established communication method, and the USB connection icon 631 for giving an instruction to switch to USB communication. A selection screen 834 displayed in a case where the external device 200 is not capable of USB communication includes the DP icon 724 but does not include the USB connection icon 631.

Note that even in a case where the user selection of the USB connection icon 631 is detected in step S801, the control unit 101 executes steps S802 to S810. Also, in a case where the external device 200 is determined to be incapable of USB communication, the control unit 101 controls the display control unit 106 and causes the display unit 107 to display a screen 837, for example. The screen 837 includes an error message informing the user that the external device cannot communicate with the selected communication method and an icon for selecting another communication method. Here, because the external device 200 is incapable of USB communication, the screen 837 includes the DP connection icon 632.

Figure 9:
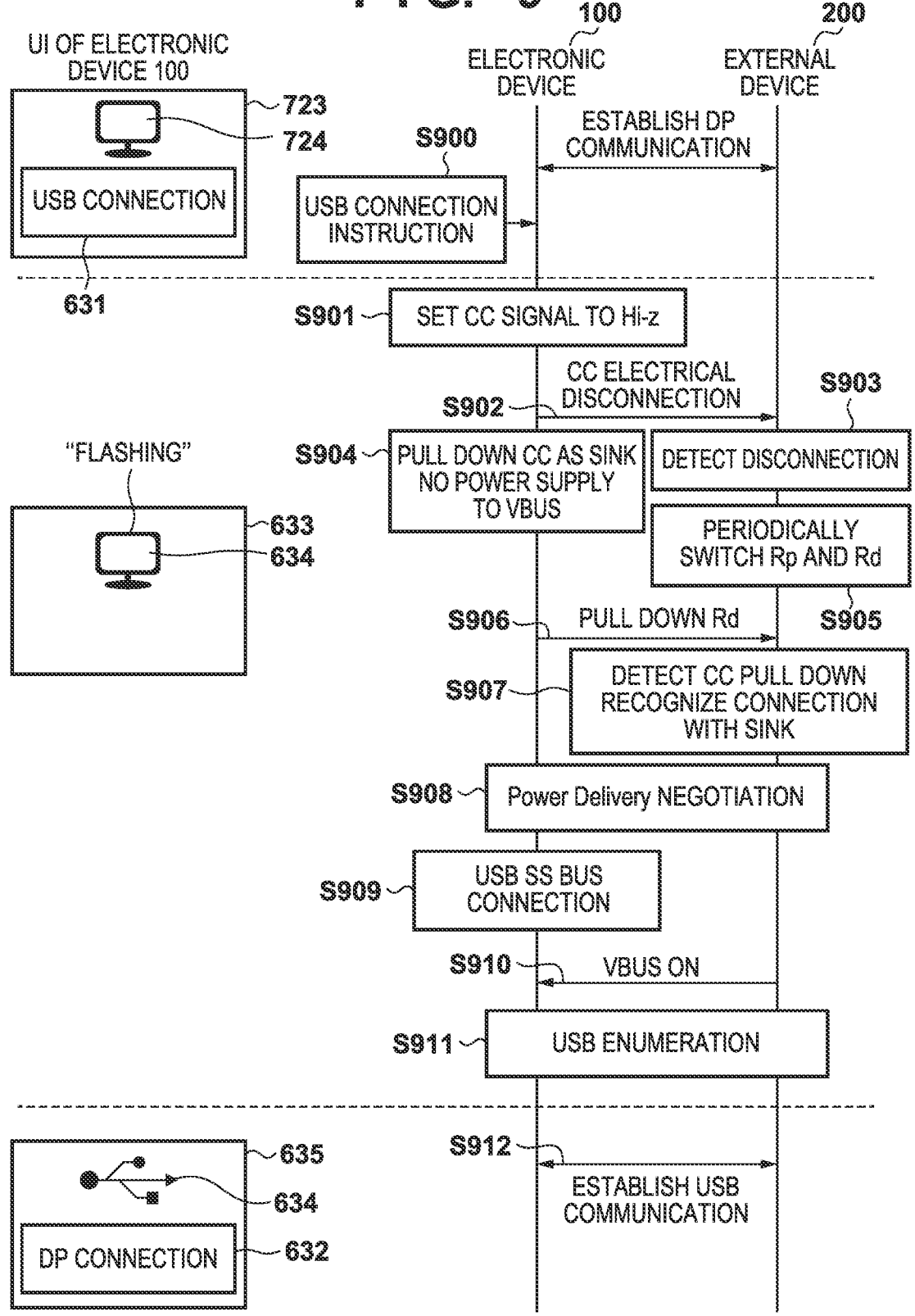
FIG. 9 is a sequence chart relating to the process to switch from DP communication to USB communication according to the second embodiment.

However, in a case where the external device 200 is capable of USB communication, after step S810. the process proceeds to step S912 of FIG. 9, and the control unit 101 establishes a USB communication without disconnecting communication.

<Operation for Switching from Non-USB Communication to USB Communication>

Next, the operation executed when the communication method between the electronic device 100 and the external device 200 is switched from non-USB communication (DP communication in this example) to USB communication will be described using the sequence chart illustrated in FIG. 9. FIG. 9 corresponds to the operation executed after the electronic device 100 and the external device 200 have established DP communication via the sequence illustrated in FIGS. 8A and 8B.

When an instruction to display the communication method selection screen is detected while DP communication is established, the control unit 101 causes the display control unit 106 to display the communication method selection screen on the display unit 107. In this example, the external device 200 has been confirmed to be capable of USB communication prior to the establishment of DP communication. In this case, the control unit 101 causes the selection screen 723 illustrated in FIG. 8B to be displayed on the display unit 107.

In step S900, the control unit 101 detects that the USB connection icon 631 on the selection screen 635 has been selected.

In step S901, the control unit 101 connects the disconnection unit 117 to the CC1, CC2 of the Type-C receptacle 115 and puts the CC in a high impedance state (Hi-z). By this, the CC is put in an electrically disconnected state (step S902).

Also, to inform the user that the USB connection process is in progress during the time from step S901 to step S911, the control unit 101 controls the display control unit 106 and causes it to display, instead of the selection screen 723, the process in progress screen 633 including the USB icon 634. Note that to make it obvious that a process is in progress, the control unit 101 may cause the USB icon 634 on the process in progress screen 633 to flash.

In step S903, the external device 200 detects the USB communication disconnection and executes a disconnection process.

In step S904, the control unit 101 controls the connection unit 118 and, to indicate that itself is a sink, connects the pull-down resistor Rd to the CC1, CC2 of the Type-C receptacle 115.

In step S905, in a similar manner to step S803, the external device 200 periodically switches the resistor connecting to the Type-C receptacle 210.

In step S906, the external device 200 is in a state with the pull-up resistor Rp connected to the Type-C receptacle 210.

In step S907, the external device 200 detects the pull down of the CC, and thus recognizes that the sink (the electronic device 100) has been connected.

In step S908, in a similar manner to step S806, the external device 200 executes a negotiation relating to power supply according to the USB PD standard with the electronic device 100.

In step S909, the control unit 101 controls the switching unit 116 and sets the MUX 114 to a state in which four signal lines of the SS 111 connect to four SS signal lines of the USB Type-C receptacle 115.

In step S909, the control unit 101 controls the switching unit 116 and connects the SS signal lines of the USB Type-C receptacle 115 and the signal lines of the SS 111 at the MUX 114.

In step S910, the external device 200 starts supplying power to the VBUS.

In step S911, the electronic device 100 and the external device 200 execute USB enumeration. In this process, the external device 200 operates as the USB host and the electronic device 100 operates as the USB device. In step S912, USB communication between the electronic device 100 and the external device 200 is established.

Also, when USB communication is enabled in step S912, the control unit 101 controls the display control unit 106 and may cause the communication method selection screen 635 to be displayed on the display unit 107. The selection screen 635 includes the USB icon 634, which is an example of information indicating the currently established communication method, and the DP connection icon 632 for giving an instruction to switch to DP communication.

As described above, the second embodiment can obtain the same effects as that of the first embodiment. Note that in the second embodiment, the electronic device connects to an external device compliant with the DisplayPort standard. However, the electronic device according to the second embodiment may be capable of connecting to an external device compliant with another standard.

Also, in the second embodiment described above, the non-USB communication performed in Alternate Mode is DP communication compliant with the DisplayPort standard. However, the second embodiment is not dependent on the type of non-USB communication. For example, non-USB communication compliant with another standard such as HDMI (registered trademark) may be performed with the external device.

Third Embodiment

Next, the third embodiment will be described. In a similar manner to the first embodiment, the third embodiment can be implemented using the electronic device 100 and the external device 200, and thus the description of common configurations and operations are omitted. In the first and second embodiment, whether or not DP/USB communication is possible with the external device is checked before establishing USB/DP communication for cases where an instruction is received to execute USB/DP communication while a connection with the external device is active. In the third embodiment. the communication capability of the external device 200 is checked in advance, and a communication method selection screen reflecting the communication capability of the external device 200 is displayed from the start.

<Operation for Checking Communication Capability when Connected with External Device>

FIGS. 10A and 10B are sequence charts relating to the operation for checking the communication capability of the external device 200 when connected with the external device 200 via a USB Type-C cable.

In step S1000, the plug of a Type-C cable is inserted into the Type-C receptacle 115, 210 of the electronic device 100 and the external device 200. At this point, as illustrated in 1030, the control unit 101 does not cause the display unit 107 to display a communication method selection screen.

In step S1001, the control unit 101, to indicate that itself is a source, controls the connection unit 118 and connects the pull-up resistor Rp to the CC1, CC2 of the Type-C receptacle 115.

In step S1002, the external device 200 alternately connects the pull-down resistor Rd and the pull-up resistor Rp to the CC1, CC2 of the Type-C receptacle 210 for a tDRP period (minimum 50 ms to maximum 100 ms).

In step S1003, the external device 200 is in a state with the resistor Rd connected to the Type-C receptacle 210.

In step S1004, the control unit 101 detects the pull down of the CC, and thus recognizes that the sink (the external device 200) has been connected.

In step S1005, in a similar manner to step S505, the control unit 101 executes a negotiation relating to power supply according to the USB PD standard with the external device 200. Via the negotiation, the settings relating to power supply between the external device 200 and the electronic device 100 are confirmed.

In step S1006, the control unit 101 controls the mode acquisition unit 119 and transmits a Discover SVIDs command to the external device 200 via the CC.

In step S1007, the external device 200 transmits back a list of the supported SVIDs.

In step S1008, the control unit 101 checks whether a DisplayPort VID (FF01h) is in the SVID list received in step S1007. In a case where a DisplayPort VID is found, the control unit 101 determines that the external device 200 supports the DisplayPort standard. Then, the control unit 101 stores the determination result as data relating to the communication capability of the external device in the RAM 104.

In step S1009, the control unit 101 connects the disconnection unit 117 to the CC1, CC2 of the Type-C receptacle 115 and puts the CC in a high impedance state (Hi-z). By this, the CC is put in an electrically disconnected state (step S1010).

In step S1011, the external device 200 detects the communication disconnection and executes a disconnection process.

In step S1012, the control unit 101 controls the connection unit 118 and, to indicate that itself is a sink, connects the pull-down resistor Rd to the CC1. CC2 of the Type-C receptacle 115.

In step S1013, in a similar manner to step S1002, the external device 200 periodically switches the resistor connecting to the Type-C receptacle 210.

In step S1014, the electronic device 100 is in a state with the resistor Rd connected to the Type-C receptacle 115.

In step S1015, the external device 200 detects the pull down of the CC, and thus recognizes that the sink (the electronic device 100) has been connected.

In step S1016, in a similar manner to the control unit 101 in step S1005, the external device 200 executes a negotiation relating to power supply according to the USB PD standard with the electronic device 100.

In step S1017. the control unit 101 controls the switching unit 116 and connects the SS signal lines of the USB Type-C receptacle 115 and the signal lines of the SS 111 at the MUX 114.

In step S1018, the external device 200 starts supplying power to the VBUS.

In step S1019, the electronic device 100 and the external device 200 execute USB enumeration. In this process, the external device 200 operates as the USB host and the electronic device 100 operates as the USB device.

In step S1020, in a similar manner to in step S810, the control unit 101 determines whether the external device 200 is operating as an USB host. Then, the control unit 101 stores the determination result as data relating to the communication capability of the external device in the RAM 104.

In step S1021, the control unit 101 connects the disconnection unit 117 to the CC1, CC2 of the Type-C receptacle 115 and puts the CC in a high impedance state (Hi-z). By this, the CC is put in an electrically disconnected state (step S1022).

In step S1023, the external device 200 detects the communication disconnection and executes a disconnection process.

In step S1024, the control unit 101 controls the display control unit 106, causes the communication method selection screen to be displayed on the display unit 107, and waits for a user instruction via the selection screen. Here, the selection screen caused to be displayed by the control unit 101 includes contents in accordance with the determination results of step S1008 and step S1020. Specifically, the control unit 101 references information relating to the communication capability of the external device 200 stored in the RAM 104. Then, the control unit 101 causes the contents of the selection screen not to display the communication methods that the external device 200 does not support (or communication methods cannot be performed with the external device 200) on the display unit 107.

In the following example, the external device 200 is determined to be a device capable of USB communication but incapable of DP communication from the determination result stored in the RAM 104. In this case, the control unit 101 causes a selection screen 1031 to be displayed that includes the USB connection icon 631 and not include a DP connection icon, for example. Alternatively, the control unit 101 causes a selection screen to be displayed that includes the USB connection icon 631 in a selectable state and a DP connection icon in a non-selectable state.

In the next example, the external device 200 is determined to be a device capable of DP communication but incapable of USB communication from the determination result stored in the RAM 104. In this case, the control unit 101 causes a selection screen 1031 to be displayed that includes the DP connection icon 632 and not include a USB connection icon, for example. Alternatively, the control unit 101 causes a selection screen to be displayed that includes the DP connection icon 632 in a selectable state and a USB connection icon in a non-selectable state.

In the next example, the external device 200 is determined to be a device capable of both USB communication and DP communication from the determination result stored in the RAM 104. In this case, the control unit 101 causes the selection screen 630 to be displayed that includes the USB connection icon 631 and the DP connection icon 632, for example.

Figure 6B:
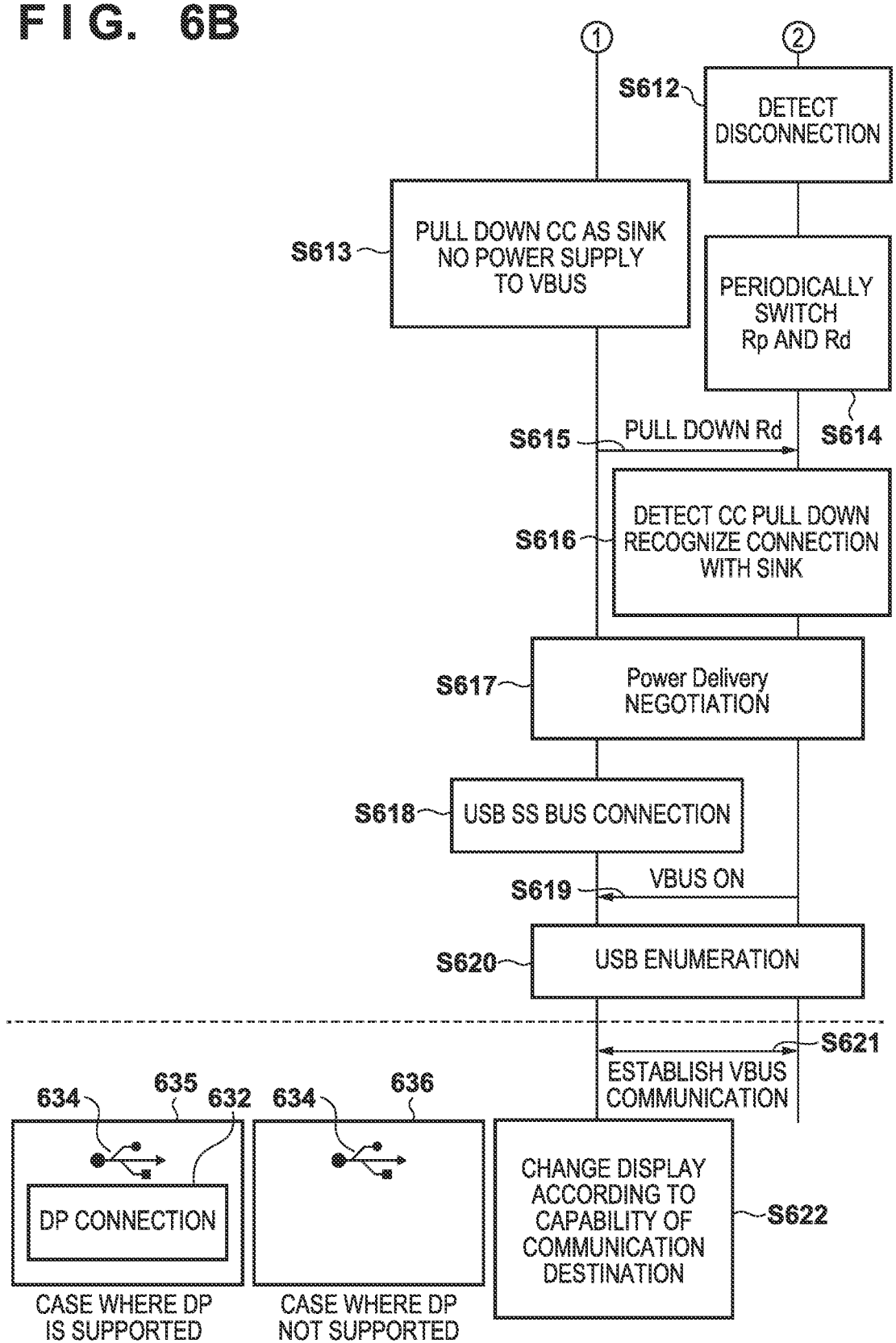
FIG. 6B is a sequence chart relating to the process to establish USB communication according to the first embodiment.

In a case where the control unit 101 detects that the user has selected the USB connection icon 631, the control unit 101 executes the steps S613 to S621 of FIG. 6B and establishes USB communication.

In a case where the control unit 101 detects that the user has selected the DP connection icon 632, the control unit 101 executes the steps S704 to S710 of FIG. 7 and establishes DP communication.

Note that in the example of FIGS. 10A and 10B, the external device 200 supports DRP according to the USB PD standard. However, the third embodiment is still able to be implemented in cases where the external device 200 does not support DRP.

For example, in a case where the external device 200 is only capable of acting as a source, the CC is pulled up in step S1002. Thus, the control unit 101 cannot detect the pull down of the CC in step S1004. Accordingly, in a case where the control unit 101 cannot detect the CC being pulled down after a certain amount of time (for example, 5 seconds) has passed in step S1004, the control unit 101 determines that the external device 200 is a device that does not support DP communication. In this manner, even in a case where the external device 200 is only capable of acting as a source, a process can be executed in a similar manner to a case where the external device 200 does not support DP communication.

Also, in a case where the external device 200 is only capable of acting as a sink, the CC is pulled down in step S1013. Thus, the external device 200 cannot detect the pull down of the CC in step S1015. Accordingly, in a case where the control unit 101 cannot start a power supply negotiation after a certain amount of time (for example, 5 seconds) has passed since the CC was pulled up in step S1012, the control unit 101 determines that the external device 200 is a device that does not support USB communication. Then, the process proceeds to step S1020, and the control unit 101 stores the determination result in the RAM 104 as data relating to the communication capability of the external device. In this manner, even in a case where the external device 200 is only capable of acting as a sink, a process can be executed in a similar manner to a case where the external device 200 does not support USB communication.

As described above, the third embodiment can obtain the same effects as that of the first and second embodiment. Furthermore, in the third embodiment, the communication capability of the external device is reflected in the selection screen from when the communication method selection screen is first displayed. This can further help prevent the user selecting a communication method unable to be performed with the external device, compared to the first and second embodiment.

Note that in the third embodiment, the electronic device includes USB host functionality or connects to an external device compliant with the DisplayPort standard. However, the electronic device according to the third embodiment may be capable of connecting to an external device compliant with another standard.

Also, in the third embodiment described above, the non-USB communication performed in Alternate Mode is DP communication compliant with the DisplayPort standard. However, the third embodiment is not dependent on the type of non-USB communication. For example, non-USB communication compliant with another standard such as HDMI (registered trademark) may be performed with the external device.

Fourth Embodiment

The various functions, processes, or methods described in the first to third embodiments can be implemented by a personal computer, a microcomputer, a central processing unit (CPU), a processor, or the like using a program. Hereinafter, in the fourth embodiment, a personal computer, a microcomputer, a CPU, a processor, or the like is referred to as "computer X". Also, in the fourth embodiment, the program for controlling the computer X and for implementing the various functions, processes, or methods described in the first to third embodiments is referred to as "program Y".

The various functions, processes, or methods described in the first to third embodiments are implemented by the computer X executing the program Y. In this case, the program Y is supplied to the computer X via a computer-readable storage medium. The computer-readable storage medium of the fourth embodiment includes at least one of a hard disk apparatus, a magnetic storage apparatus, an optical storage apparatus, a magneto-optical storage apparatus, a memory card, a volatile memory, anon-volatile memory, or the like. The computer-readable storage medium of the fourth embodiment is a non-transitory storage medium.

While various embodiments of the disclosure are described with reference to example embodiments, it is to be understood that the aspects of the disclosure are not limited to the example embodiments. The scope of the following claims is to be accorded the broadest interpretation so as to encompass all such modifications and equivalent structures.

The invention claimed is:

1. An electronic device comprising:
a communication unit that communicates with an external device selectively using one of communication methods;
a control unit that determines a communication method, from among the communication methods, that is unable to be used in communication with the external device; and
a display unit that displays a user interface for selecting a communication method to be used to communicate with the external device,
wherein, in a case where the control unit detects that a user has selected a communication method from the user interface, the control unit, prior to executing a process to establish communication using a user selected communication method, causes the communication unit to execute a process to establish communication using a communication method, from among the communication methods, other than the user selected communication method and determines a communication method unable to be used in communication with the external device,
wherein, after determining the communication method unable to be used in communication with the external device, the control unit starts the process to establish communication using the user selected communication method,
wherein, the display unit displays, in a state where the communication using the user selected communication method has been established, on the display means, the user interface with the determined communication method unselectable, and
wherein, in a state where the communication using the user selected communication method has been established and when detecting that a user has selected a second communication method from the user interface, the control unit starts a process to establish communication with the external device using the second communication method.

2. The electronic device according to claim 1, wherein the control unit determines a communication method that the external device does not support as a communication method unable to be used in communication with the external device.

3. The electronic device according to claim 1, wherein the control unit determines the communication method to be a communication method unable to be used in communication with the external device, in a case where the external device does not include necessary functionality to communicate with the electronic device using a communication method but supports the communication method.

4. The electronic device according to claim 3, wherein the control unit determines the communication method to be a communication method unable to be used in communication with the external device, in a case where the communication method requires communicating devices to execute different functions.

5. The electronic device according to claim 3, wherein the control unit determines a communication method using USB PD standard to be a communication method unable to be used in communication with the external device, in a case where the electronic device and the external device both function as either a source device or a sink device according to USB PD standard.

6. The electronic device according to claim 5, wherein the communication method using USB PD standard is communication compliant with DisplayPort standard.

7. The electronic device according to claim 3, wherein the control unit determines USB communication to be a communication method unable to be used in communication with the external device, in a case where the electronic device and the external device both function as either a USB host or a USB device.

8. A method of controlling an electronic device, the electronic device having a communication unit that communicates with an external device selectively using one of communication methods and a display unit, the method comprising:
determining a communication method, from among the communication methods, unable to be used in communication with an external device;
causing the display unit to display a user interface for selecting a communication method to be used to communicate with the external device;
in a case where a user has selected a communication method from the user interface,
prior to executing a process to establish communication using a user selected communication method, causing the communication unit to execute a process to establish communication using a communication method, from among the communication methods, other than the user selected communication method and
determining a communication method unable to be used in communication with the external device;
after determining the communication method unable to be used in communication with the external device, starting the process to establish communication using the user selected communication method;
in a state where the communication using the user selected communication method has been established, causing the display unit to display the user interface with the determined communication method unselectable; and
in a state where the communication using the user selected communication method has been established and a user has selected a second communication method from the user interface, starting a process to establish communication with the external device using the second communication method.

9. A non-transitory storage medium that stores a program causing a computer to execute a method, the method comprising:
determining a communication method, from among communication methods, unable to be used in communication with an external device;
causing a display unit of an electronic device to display a user interface for selecting a communication method to be used to communicate with the external device from among communication methods;
in a case where a user has selected a communication method from the user interface,
prior to executing a process to establish communication using a user selected communication method, causing the electronic device to execute a process to establish communication using a communication method, from among the communication methods, other than the user selected communication method and
determining a communication method unable to be used in communication with the external device;

after determining the communication method unable to be used in communication with the external device, causing the electronic device to start the process to establish communication using the user selected communication method;

in a state where the communication using the user selected communication method has been established, causing the display unit to display the user interface with the determined communication method unselectable; and in a state where the communication using the user selected communication method has been established and a user has selected a second communication method from the user interface, causing the electronic device to start a process to establish communication with the external device using the second communication method.

* * * * *